(12) United States Patent
Iwami

(10) Patent No.: US 7,171,453 B2
(45) Date of Patent: Jan. 30, 2007

(54) VIRTUAL PRIVATE VOLUME METHOD AND SYSTEM

(75) Inventor: Naoko Iwami, Cupertino, CA (US)

(73) Assignee: Hitachi, Ltd., Tokyo (JP)

( * ) Notice: Subject to any disclaimer, the term of this patent is extended or adjusted under 35 U.S.C. 154(b) by 788 days.

(21) Appl. No.: 09/839,952

(22) Filed: Apr. 19, 2001

(65) Prior Publication Data
US 2002/0156867 A1 Oct. 24, 2002

(51) Int. Cl.
G06F 15/16 (2006.01)
(52) U.S. Cl. .................... 709/218; 709/238; 709/249
(58) Field of Classification Search ............. 709/217, 709/215, 218–226, 238, 245–249, 221–232, 709/200–206; 711/154, 147, 170, 148, 158, 711/152, 178, 162; 707/206
See application file for complete search history.

(56) References Cited

U.S. PATENT DOCUMENTS

| | | | | |
|---|---|---|---|---|
| 5,619,497 A * | 4/1997 | Gallagher et al. | .......... | 370/394 |
| 6,047,320 A * | 4/2000 | Tezuka et al. | .............. | 709/223 |
| 6,085,238 A * | 7/2000 | Yuasa et al. | ................. | 709/223 |
| 6,101,606 A * | 8/2000 | Diersch et al. | ................ | 726/27 |
| 6,128,664 A * | 10/2000 | Yanagidate et al. | ......... | 709/228 |
| 6,192,454 B1 * | 2/2001 | De Vos | ....................... | 711/154 |
| 6,198,741 B1 * | 3/2001 | Yoshizawa et al. | ......... | 370/392 |
| 6,216,211 B1 * | 4/2001 | McBrearty et al. | ......... | 711/162 |
| 6,321,239 B1 * | 11/2001 | Shackelford | ................ | 707/206 |
| 6,421,711 B1 * | 7/2002 | Blumenau et al. | .......... | 709/213 |
| 6,466,978 B1 * | 10/2002 | Mukherjee et al. | ......... | 709/225 |
| 6,496,866 B2 * | 12/2002 | Attanasio et al. | ........... | 709/239 |
| 6,507,873 B1 * | 1/2003 | Suzuki et al. | ............... | 709/245 |
| 6,529,944 B1 * | 3/2003 | LeCrone | ....................... | 709/211 |
| 6,601,101 B1 * | 7/2003 | Lee et al. | .................... | 709/227 |
| 6,606,690 B2 * | 8/2003 | Padovano | ................... | 711/148 |
| 6,622,220 B2 * | 9/2003 | Yoshida et al. | ............. | 711/152 |
| 6,735,623 B1 * | 5/2004 | Prust | .......................... | 709/219 |
| 6,745,310 B2 * | 6/2004 | Chow et al. | ................. | 711/170 |

(Continued)

OTHER PUBLICATIONS

The ATM Forum, Multi-Protocol Over ATM (MPOA)—A Brief Description, 1997, ATM Forum, pp. 1-3.*

(Continued)

*Primary Examiner*—Philip Tran
*Assistant Examiner*—Asad Muhammed Nawaz
(74) *Attorney, Agent, or Firm*—Sughrue Mion, PLLC; Pavel Pogodin, Esq.

(57) ABSTRACT

The present invention provides techniques for managing access to storage resources. In specific embodiments, storage devices provide storage resources to users using a system of virtual addresses and virtual volume identifiers. In select specific embodiments, a storage service provider (SSP) can make volumes available to a user, which may be a company, for example, in the user's network via the Internet or other kinds of network connections. In specific embodiments, the SSP and the user's data center can conceal the identity of the storage devices, volumes, and equipment of the SSP, as well as that of the user's data center in order to provide privacy to both user and storage provider.

26 Claims, 10 Drawing Sheets

| | User Type | User Address | Virtual Destination Address | Destination Address | Virtual Private Volume ID | Volume ID |
|---|---|---|---|---|---|---|
| 3001 / 3002 / 3003 / 3004 / 3005 / 3006 | | | | | | |
| 3007 | Group | AAA.AA.*.* ~3010 | AAA.AA.1.3 ~3013 | WWN ~3016 | 5 ~3019 | 25 ~3022 |
| 3008 | Personal | 123.456.78.9 ~3011 | 123.456.78.0 ~3014 | XXY ~3017 | 6 ~3020 | 8 ~3023 |
| 3009 | Group | CCC.CC.*.* ~3012 | CCC.CC.1.3 ~3015 | WWN ~3018 | 7 ~3021 | 24 ~3024 |
| 2007 | : | : | : | : | : | : |

U.S. PATENT DOCUMENTS

| | | | |
|---|---|---|---|
| 6,748,502 B2 * | 6/2004 | Watanabe et al. | 711/158 |
| 6,842,784 B1 * | 1/2005 | Black | 709/225 |
| 6,912,589 B1 * | 6/2005 | Jain et al. | 709/238 |
| 2002/0156828 A1 * | 10/2002 | Ishizaki et al. | 709/201 |
| 2002/0194294 A1 * | 12/2002 | Blumenau et al. | 709/213 |
| 2003/0131182 A1 * | 7/2003 | Kumar et al. | 711/5 |
| 2004/0093424 A1 * | 5/2004 | Kojima | 709/232 |
| 2004/0172480 A1 * | 9/2004 | Hirose et al. | 709/238 |

OTHER PUBLICATIONS

Microsoft, Understanding Network Address Translation, Feb. 28, 2000, Microsoft, pp. 1-3.*

LUN Security Considerations for Storage Area Networks by HU YOSHIDA, Hitachi Data Systems, 1999.

* cited by examiner

| | User Type | User Address | Virtual Destination Address | Destination Address | Virtual Private Volume ID | Volume ID |
|---|---|---|---|---|---|---|
| 3007 | Group | AAA.AA.*.* ~3010 | AAA.AA.1.3 ~3013 | WWN ~3016 | 5 ~3019 | 25 ~3022 |
| 3008 | Personal | 123.456.78.9 ~3011 | 123.456.78.0 ~3014 | XXY ~3017 | 6 ~3020 | 8 ~3023 |
| 3009 | Group | CCC.CC.*.* ~3012 | CCC.CC.1.3 ~3015 | WWN ~3018 | 7 ~3021 | 24 ~3024 |
| 2007 | | | | | | |

Fig. 3

VIRTUAL PRIVATE VOLUME METHOD AND SYSTEM

BACKGROUND OF THE INVENTION

The present invention relates generally to data storage systems, and in particular to techniques for controlling storage access based on a designated time.

The information technology revolution brings with it an ever increasing need for more storage capacity for business enterprises. It is expected that the average Fortune 1000 company's storage requirement will more than double in the coming years. In addition, growth has brought shortages of skilled persons in the information technology field. These challenges confront many companies facing the need to expand and improve their information technology assets. Increasingly, companies are turning to outsourcing storage management as a method of coping with the need to grow capacity in view of rapidly increasing demand. Storage Service Providers (SSPs) is one such service for providing storage infrastructure management to business enterprises. By subscribing to an SSP, companies can obtain needed storage resources by purchasing the services from the SSP. The SSP owns storage systems, which it uses to provide storage capacity for the users' host systems, as well as provide the storage management services. Users pay for the storage usage and management services based upon the terms of a service level agreement (SLA) made between the user and the SSP.

While certain advantages to present SSP technologies are perceived, opportunities for further improvement exist. For example, according to conventional SSP technology, the SSP provides storage resources for the host systems in the user's site in disk storage systems owned by the SSP at the site. However, some SSP users would like to locate their equipment remotely from the SSP site. For example, users may wish to access data held in the storage systems of the SSP via the Internet, or other network. Further, security is an important concern to both the user and the SSP. For the user, this means that valuable business information assets can be protected by restricting access to the data in storage. For the SSP, this means that data integrity is preserved for its customers, and that no user receives access that is not authorized. For example, various divisions or departments in a large company may wish to have their own storage resources, which are private and therefore cannot be accessed by members of other divisions or departments.

What is needed are improved techniques for managing access to storage resources.

SUMMARY OF THE INVENTION

The present invention provides techniques for managing access to storage resources. In specific embodiments, storage devices provide storage resources to users using a system of virtual addresses and virtual volume identifiers. In select specific embodiments, a storage service provider (SSP) can make volumes available to a user, which may be a company, for example, in the user's network via the Internet or other kinds of network connections. In specific embodiments, the SSP and the user's data center can conceal the identity of the storage devices, volumes, and equipment of the SSP, as well as that of the user's data center in order to provide privacy to both user and storage provider.

In a representative specific embodiment according to the present invention, a storage apparatus is provided. The storage apparatus comprises a gateway, having a processor, a memory, and at least one port operative to connect to an external network; one or more devices that store information, each of the devices further comprising one or more volumes; a server; a switch; and an internal network connecting the gateway, the server, the switch, and the one or more devices that store information. The gateway receives a data packet for storing, and thereupon searches in the memory for a virtual destination address retrieved from the data packet, and thereupon reads from the memory a corresponding destination address for a particular one of the one or more devices that store information, and thereupon replaces in the data packet the virtual destination address with the corresponding destination address from the memory. In specific embodiments, the virtual destination address and the destination address are stored in a table. However, in other embodiments, these addresses, as well as volume identifiers and user identifiers may be stored in other types of data structures, such as link lists, queues, stacks, and so forth. Further, these data structures may be disposed in memory or stored in a disk storage, and the like.

In a specific embodiment, the gateway authenticates a source of the data packet based upon a user address in the data packet. In some specific embodiments, the external network comprises a virtual private network (VPN). In such embodiments, the gateway, for example, performs VPN processing for the data packet.

In specific embodiments, the external network uses a first protocol and the internal network uses a second protocol, which may be different from the first protocol. In such cases, the gateway, for example, translates the data packet from the first protocol to the second protocol. The first protocol can be any one of an IP protocol, ATM, and Fibre channel, protocols, for example, as well as any of a variety of other protocols known to those skilled in the art. Similarly, the second protocol comprises any one of the previously mentioned protocols.

In specific embodiments, the gateway searches in the data packet for a command and a virtual private volume identifier, and if found, thereupon searches in the memory for a volume identifier corresponding to the virtual private volume identifier, and thereupon replaces the virtual private volume identifier in the data packet with the volume identifier.

In specific embodiments, the gateway receives a data packet being sent to the external network, and thereupon searches in the memory for a destination address retrieved from the data packet, and thereupon reads from the memory a corresponding virtual destination address from the memory, and thereupon replaces in the data packet the destination address with the corresponding virtual destination address from the memory.

In an alternative specific embodiment according to the present invention, a storage apparatus is provided. The storage apparatus comprises a server, having a processor, a memory, and at least one port operative to connect to an external network; one or more devices that store information, each of the devices further comprising one or more volumes; a switch; and an internal network connecting the server, the switch, and the one or more devices that store information. The server receives a data packet for storing, and thereupon searches in the memory for a virtual destination address retrieved from the data packet, and thereupon reads from the memory a corresponding destination address for a particular one of the one or more devices that store information, and thereupon replaces in the data packet the virtual destination address with the corresponding destination address from the memory.

In an alternative specific embodiment according to the present invention, a storage apparatus is provided. The storage apparatus comprises a switch, having a processor, a memory, and at least one port operative to connect to an external network; one or more devices that store information, each of the devices further comprising one or more volumes; a server; and an internal network connecting the server, the switch, and the one or more devices that store information. The switch receives a data packet for storing, and thereupon searches in the memory for a virtual destination address retrieved from the data packet, and thereupon reads from the memory a corresponding destination address for a particular one of the one or more devices that store information, and thereupon replaces in the data packet the virtual destination address with the corresponding destination address from the memory.

In an alternative specific embodiment according to the present invention, a storage apparatus is provided. The storage apparatus comprises one or more devices that store information, each of the devices further comprising one or more volumes, a processor, a memory, and at least one port operative to connect to an external network; a switch; a server; and an internal network connecting the server, the switch, and the one or more devices that store information. The one or more devices that store information receives a data packet for storing, and thereupon searches in the memory for a virtual destination address retrieved from the data packet, and thereupon reads from the memory a corresponding destination address for a particular one of the one or more devices that store information, and thereupon replaces in the data packet the virtual destination address with the corresponding destination address from the memory.

In a representative specific embodiment according to the present invention, a method for managing storage is provided. The method comprises receiving a data packet; searching for a virtual destination address retrieved from the data packet; reading a corresponding destination address for a particular one of one or more devices that store information; and replacing in the data packet the virtual destination address with the corresponding destination address.

Numerous benefits are achieved by way of the present invention over conventional techniques. Specific embodiments according to the present invention can enable a storage service provider (SSP) to make volumes available to a user, which may be a company, for example, in the user's network via the Internet or other kinds of network connections. In specific embodiments, the SSP and the user's data center can conceal the identity of the storage devices, volumes, and equipment of the SSP, as well as that of the user's data center in order to provide privacy to both user and storage provider.

These and other benefits are described throughout the present specification. A further understanding of the nature and advantages of the invention herein may be realized by reference to the remaining portions of the specification and the attached drawings.

BRIEF DESCRIPTION OF THE DRAWINGS

FIG. 3 illustrates a diagram of a representative format of a view table in a specific embodiment of the present invention.

DESCRIPTION OF THE SPECIFIC EMBODIMENTS

The present invention provides techniques for managing access to storage resources. In specific embodiments, storage devices provide storage resources to users using a system of virtual addresses and virtual volume identifiers. In select specific embodiments, a storage service provider (SSP) can make volumes available to a user, which may be a company, for example, in the user's network via the Internet or other kinds of network connections. In specific embodiments, the SSP and the user's data center can conceal the identity of the storage devices, volumes, and equipment of the SSP, as well as that of the user's data center in order to provide privacy to both user and storage provider.

Virtual Private Network (VPN) is a network technology for obtaining private network like environments using a public network, such as the Internet. Two or more networks can connect via the Internet and communicate with each other as one private network using VPN. One noteworthy limitation to conventional VPN technologies is that they do not conceal the identity of all equipment in the networks that comprise the virtual private network.

Zoning technology is a Fibre Channel (FC) switching technology. Zoning technology enables a port to be assigned to an other port, enabling equipment connected to one port to be able to use volumes that are connected to other ports to be assigned to that port. Conventionally, each piece of equipment connects to the FC switch directly. Further, conventional zoning techniques do not conceal the identity of volumes which are connected to a common port and may be used by other equipment.

Logical Unit Number (LUN) security is a storage technology in which a storage device connected by a Fibre Channel, for example, detects equipment identities, called World Wide Names (WWN), so that the identity of volumes within the storage devices are protected from unauthorized access. Conventionally, each piece of equipment connects to the FC switch directly. Further, in conventional approaches, users may be aware of a LUN and port address.

Figure 1:
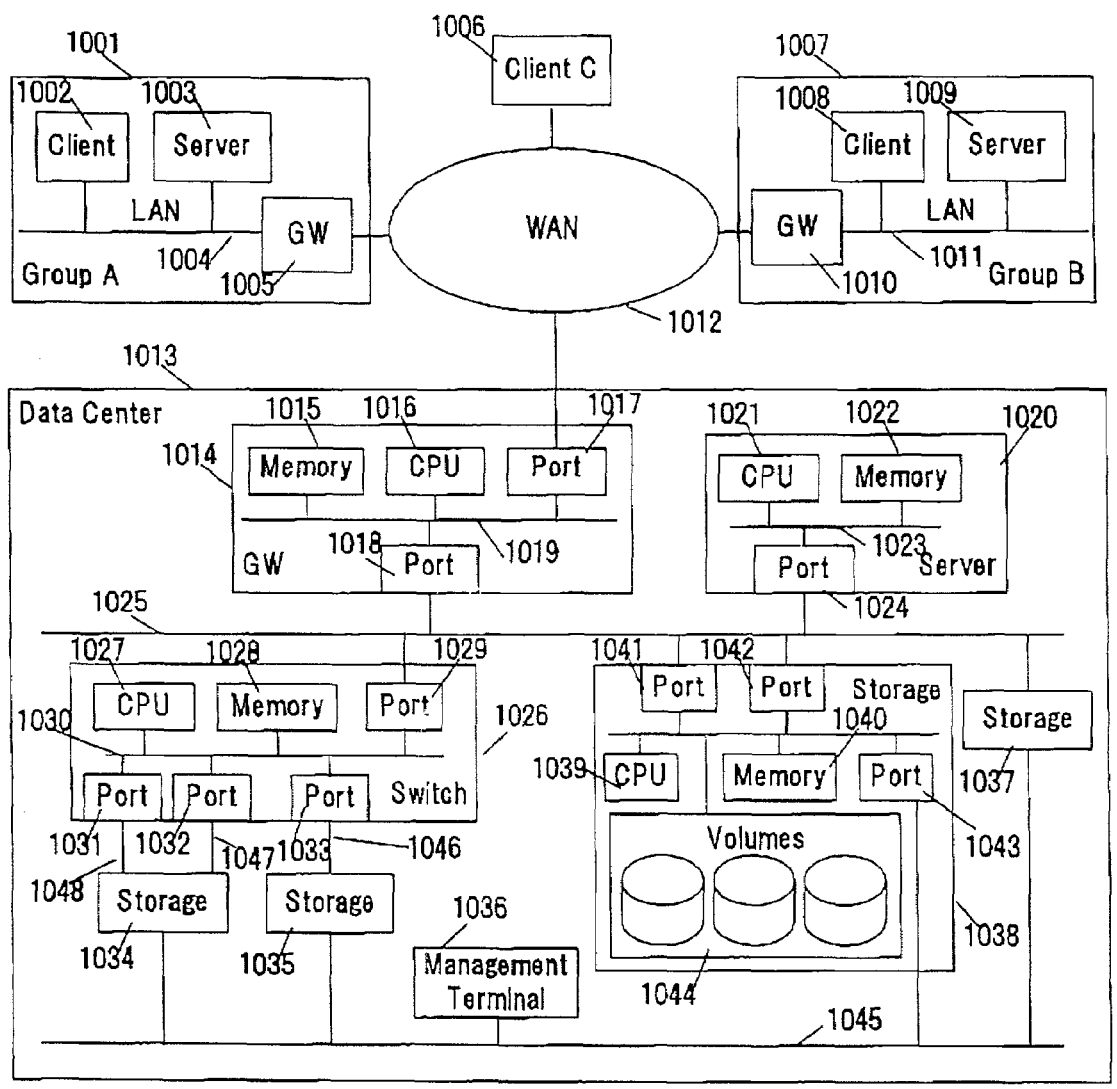
FIG. 1 illustrates a diagram of a representative configuration of an example storage service provider (SSP) in a specific embodiment of the present invention.

FIG. 1 illustrates a diagram of a representative configuration of an example storage service provider (SSP) in a specific embodiment of the present invention. Group A 1001 indicates a user's local network. Group B 1007 indicates another user's local network. Client C 1006 indicates a personal user. A data center 1013 comprises equipment of a storage provider, which can be an SSP, in a specific embodiment. The data center 1013 has at least one gateway 1014 and at least one storage 1038. Users can connect to data center 1013 via a wide area network (WAN) 1012. WAN 1012 can be for example, the Internet, an ATM leased line, and so on. Each user can use the same network for connecting to the data center 1013, for example. The users can use their own leased line for connecting to the data center 1013 directory, as well. Gateway 1014 has at least one port 1017 for connecting to network 1012 outside of the data center 1013. Gateway 1014 has at least one port 1018 for connecting to network 1025 inside of the data center 1013. Network 1025 is used for accessing storage devices. Storage 1038 has at least one port 1042 for connecting to network 1025. Volumes 1044 are defined for the storage 1038, and have volume IDs that can be for example a Logical Unit Number (LUN) defined by the Small Computer System Interface (SCSI) protocol, for example. Port 1043 is connected to network 1045, and is used for management. Management terminal 1036 is connected to storage 1038, 1037, 1034, 1035 via network 1045, and is used to define the storage configuration. Switch 1026 has at least one port 1029 for connecting to the network 1025. Switch 1026 also has at least one port 1031 for connecting to the storage 1034. In another specific embodiment, in which the network 1025 and network 1045 are of the same type, for example both are IP networks, network 1025 and network 1045 can be integrated into one network. In another specific embodiment, in which the network 1012 is of a different type than network 1025, for example network 1012 is an IP network and network 1025 is a Fibre Channel (FC) network, the gateway 1014 provides a protocol exchange function between these different types of networks. In a specific embodiment in which the storage 1034 supports networks of different types, for example network 1025 is an IP network and a network 1048 is an FC network, switch 1026 provides protocol exchange functions between the different protocols. In such specific embodiments, the storage 1034 and storage 1038 support different network protocols. For example, in a specific embodiment in which network 1048 and network 1046 support different protocols, and network 1046 uses the same protocol as network 1025, the switch 1026 can provide protocol exchange functions. Further, the storage 1034 and the storage 1038 can support different network protocols and may use different storage access protocols, as well. In another specific embodiment, in which network 1048 and network 1046 use different network protocols and the storage 1034 and the storage 1035 communicate via switch 1026, the switch 1026 can provide protocol exchange function. Further, the storage 1034 and storage 1038 can support different network protocols and may use different storage access protocols, as well. In specific embodiments, the data center 1013 can be configured such that switch 1026, server 1020, or both are not included.

Figure 2:
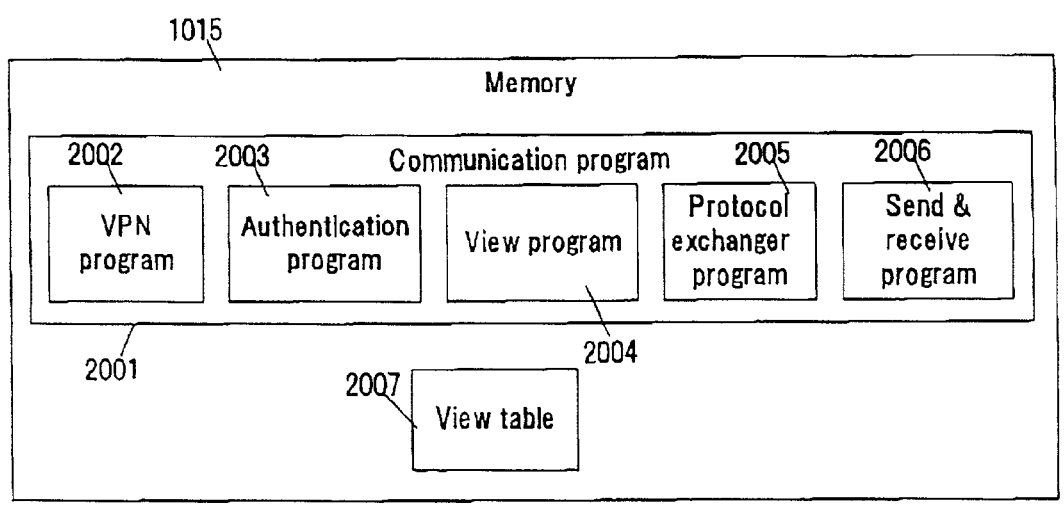
FIG. 2 illustrates a block diagram of representative programs in a specific embodiment of the present invention.

FIG. 2 illustrates a block diagram of representative programs in a specific embodiment of the present invention. In a specific embodiment, the programs illustrated by FIG. 2 are disposed in the memory 1015 of gateway 1014 in FIG. 1. As shown by FIG. 2, in a specific embodiment, a communication program 2001 comprises a plurality of component program processes, including one or more of a virtual private network (VPN) program 2002, an authentication program 2003, a view program 2004, a protocol exchanger program 2005 and a send and receive program 2006. A virtual private network (VPN) program 2002 enables the user to define a private network for accessing volumes within the data center 1013 using a public network. In a specific embodiment in which a user does not use the virtual private network (VPN) for defining a private network using a public network, the VPN program 2002 may be omitted. An authentication program 2003 provides the capability to authenticate the identity of a user who attempts to access information in one of the storage devices 1034 of the data center 1013. In a specific embodiment in which the gateway 1014 does not check user identity, the authentication program 2003 may be omitted. A view program 2004 provides translation of virtual and real addresses of volumes for storing data in the data center 1013. A protocol exchanger program 2005 provides protocol exchange functions that enable apparatus connected by networks of different topologies communicate with each other, such as for example an IP network communicating with an FC network. Further, the protocol exchanger program 2005 enables apparatus which use different storage access protocols, such as for example, SCSI and FC, to communicate with each other. In a specific embodiment, in which network 1012, external to data center 1013, and network 1025, internal to data center 1013, are of the same kind, the protocol exchanger program 2005 may be omitted. A send and receive program 2006 provides communications functions along the network. A view table 2007, which maintains information about storage in the data center 1013 that is allocated to various users for view program 2004, is also disposed in memory 1015.

FIG. 3 illustrates a diagram of a representative format of a view table in a specific embodiment of the present invention. As shown by FIG. 3, in a specific embodiment, the view table 2007 comprises a plurality of information fields for users. A user type 3001 indicates information about the user. A user address 3002 indicates an address of an individual user's machine, or a group of addresses for multiple users. For example, when the user type 3001 is set to "group," such as for user group 3007, users belonging to the group 3007 are defined by a common set of user addresses 3010, which have access to the same volume in the data center 1013. When the user type 3001 is set to "personal," such as for personal user 3008, then that user is defined by a user address 3011, which can access a volume in the data center 1013. A Virtual Destination Address (VDA) 3003 is used by the user to specify a storage unit known to the user. The storage device has a volume, also known to the user, in which the user's information is stored. In a specific embodiment in which a user uses VPN to access data center 1013, the virtual destination address (VDA) is an IP address in a private network defined by the user using VPN. A destination address 3004 is an address of a storage device in the data center 1013, which is not known to the user. For example, the destination address 3004 can be an IP address, a hostname, a World Wide Name (WNN) for a fibre channel network, and so forth. When a storage unit has more than two ports for connecting to a network, then the storage unit will have a destination address 3004 for each port. A virtual private volume ID 3005 is used by user's to specify a volume that the user wishes to access. A volume ID 3006 is a volume ID that is not known to the user. Volume ID 3006 may be, for example a Logical Unit Number (LUN) defined by the SCSI protocol in various specific embodiments. The storage unit accesses the volume using the volume ID 3006.

Figure 4:
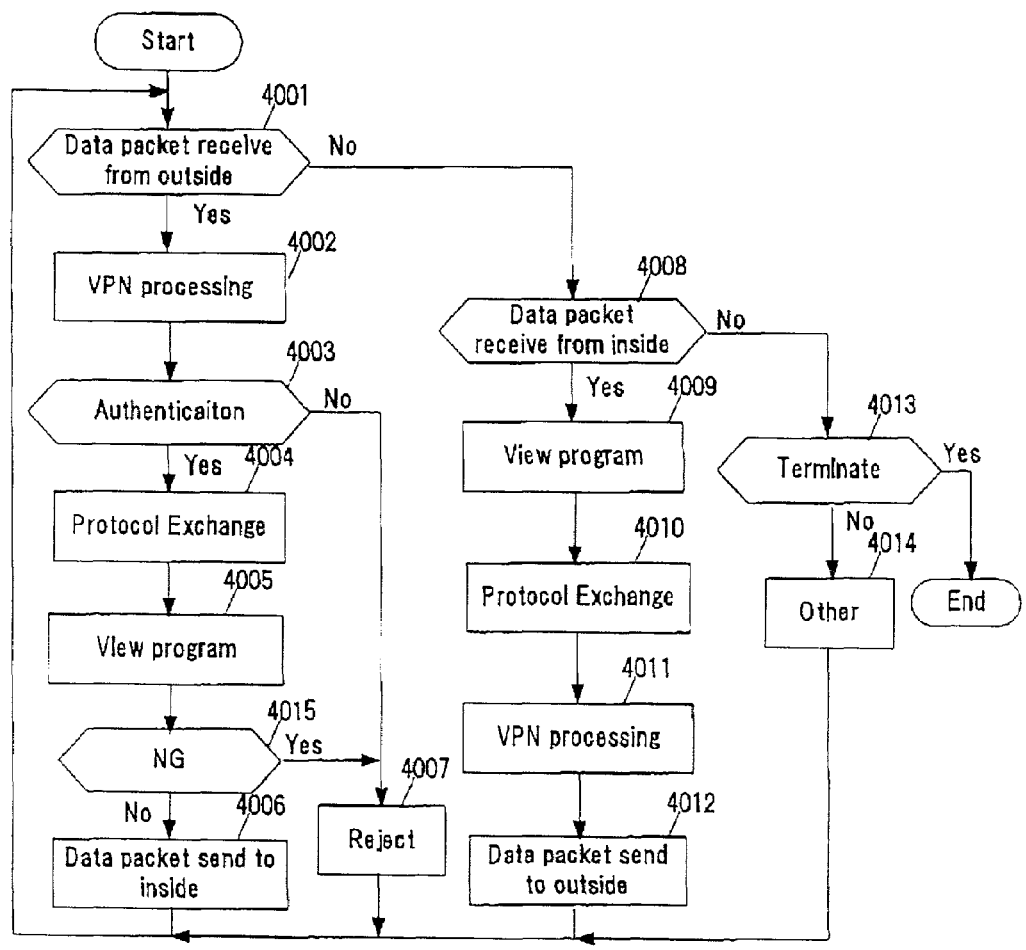
FIG. 4 illustrates a flow chart of a representative communication program in a specific embodiment of the present invention.
Figure 5:
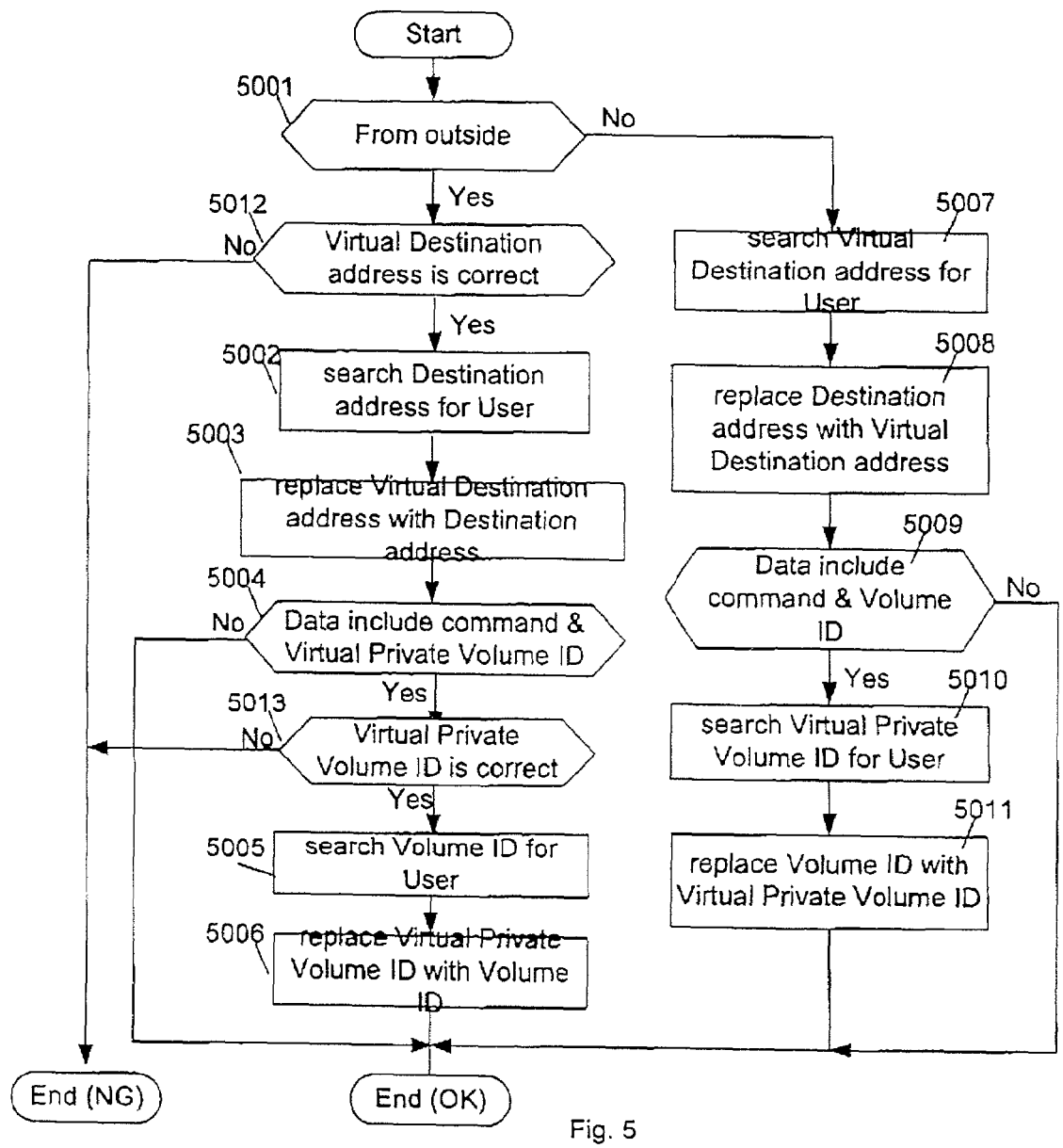
FIG. 5 illustrates a flow chart of a representative view program processing in a specific embodiment of the present invention.

FIG. 4 illustrates a flow chart of a representative communication program in a specific embodiment of the present invention. As shown in FIG. 4, in a specific embodiment, communication program 2001 resides in memory 1015 of gateway 1014. The communication program 2001 receives and processes data packets containing data to be stored on one of the volumes of the data center 1013. After a data packet is received, a check is made whether the data packet is an inbound data packet that was received from a source external to data center 4001, such as from client 1002 of Group A, for example. If the packet was received from outside of the data center 1013, then processing continues with step 4002. Otherwise, processing continues with step 4008. In an optional step 4002, the packet is processed by the virtual private network program 2002, in specific embodiments that use virtual private network to connect with data center 1013. In specific embodiments, using a virtual private network involves encrypting data before sending it through the public network and decrypting it at the receiving end. An additional level of security involves encrypting not only the data but also the originating and receiving network addresses. Accordingly, in specific embodiments, the virtual private network program 2002 performs decryption of data, and optionally address information, in the data packet. Next, the packet may be authenticated by an authentication program 2003 in an optional step 4003. If the packet passes authentication, then processing continues with a step 4004. Otherwise, the packet is rejected in a step 4007. In optional step 4004, the protocol exchanger program 2005 performs any protocol translation required. For example, transforming data packet format, address formats, and so forth. Then, in a step 4005, view program 2005 translates address and volume information in the data packet according to an entry for the user originating the data packet in the view table 2007. For inbound packets, the virtual destination address is replaced by a destination address and virtual volume ID is replaced with a volume ID. A representative view program process is illustrated by FIG. 5 for a specific embodiment. In a step 4015, a result of view program 2005 processing is checked. If the view program returned "no good (NG)," then the packet is rejected in step 4007, and processing continues with step 4001 for the next data packet. Otherwise, if the view program did not return "no good," then in a step 4006, the packet is sent to network 1025 inside the data center, and processing continues with step 4001 for the next data packet.

If the data packet was not received from outside of the data center 1013, then in a step 4008, a check is made to determine if the data packet is outbound information received from inside the data center 1013. If the packet was received from inside the data center 1013, such as from storage 1038, for example, then in a step 4009, the view program 2005 view program 2005 translates address and volume information in the data packet according to an entry for the user originating the data packet in the view table 2007. For outbound packets, destination address is replaced by a virtual destination address and volume ID is replaced with a virtual volume ID. Otherwise, in a step 4013, a decision is made whether to terminate processing, or perform an error recovery task in step 4014 prior to continuing with step 4001 for the next data packet. Then, in an optional step 4010, in a specific embodiment, the protocol of the data packet is exchanged, if needed. Then, in an optional step 4011, in a specific embodiment that uses VPN, the VPN program 2002 processes the data packet. The virtual private network program 2002 performs encryption of data, and optionally address information, in the data packet. Then, in a step 4012, the data packet is sent to network 1012 outside of data center 1013. In a specific embodiment in which VPN is not supported or is not used, the VPN processing steps 4002 and 4011 may be omitted. In a specific embodiment in which the network 1012 outside of the data center 1013 and the network 1025 inside of the data center 1013 are of the same type, the protocol exchange steps 4004 and 4010 may be omitted. In a specific embodiment in which the gateway does not check user identity, the authentication step 4003 may be omitted.

FIG. 5 illustrates a flow chart of a representative view program processing in a specific embodiment of the present invention. In specific embodiments, view program processing illustrated by the flow chart of FIG. 5 corresponds to view program 2004 of FIG. 2, and processing of steps 4005 and 4009 of FIG. 4. In a specific embodiment, after a data packet is received, a check is made whether the data packet is an inbound data packet that was received from a source outside of data center 1013 in a step 5001. If the data packet is from a source external to the data center 1013, then in a step 5012, a determination is made whether a virtual destination address 3003, which is a user defined storage address that is known to and used by the user, is the correct address for the user. This may be performed by referring to the view program table 2007, which provides the known correct addresses for each user. In a specific embodiment, the virtual destination address 3003 is checked to see if it is the correct address for the user that sent the data packet. If the virtual destination address 3003 is not correct, then processing returns a "no good" (NG) return condition to the invoking process. Otherwise, in a step 5002, the view table 2007 of FIG. 3 is searched for a destination address 3004 corresponding to the virtual destination address 3003 embedded in the data packet. Then, in a step 5003, the virtual destination address 3003 in the data packet is replaced by the destination address 3004 from view table 2007. Then, in a step 5004, a determination is made whether the data packet includes a storage access command, and if so, whether that command includes a virtual volume ID 3005. If the data packet does not include a virtual volume ID, then processing returns to an invoking process with an OK state, having translated the virtual destination address 3003 into a destination address 3004 in the data packet. Otherwise, in a step 5013, a determination is made whether the virtual private volume ID for the user who sent the data packet is correct, again by checking the contents of the view table 2007. If an incorrect virtual private volume ID is discovered, then processing returns a "no good" return condition to an invoking process. Otherwise, in a step 5005, the view table 2007 is searched for the volume ID 3006 corresponding to the virtual private volume ID 3005 for the user who sent the packet. Then, in a step 5006, the virtual volume ID 3005 in the data packet is replaced with a volume ID 3006 retrieved from the view table 2007.

If the data packet was not received from outside of the data center 1013, then it is an outbound packet. Accordingly, in a step 5007, the view table 2007 is searched for the virtual destination address 3003 for the user to whom the data packet is being sent. Then, in a step 5008, the destination address 3004 in the data packet is replaced with a virtual destination address 3003 for the user retrieved from the view table 2007. Then, in a decisional step 5009, a determination is made whether the data packet includes a storage access command and a volume ID 3006. If the data packet includes a storage access command, and that command includes a volume ID 3006, then the view table 2007 is searched for the volume ID 3006 for the user in a step 5010. The volume ID 3006 is replaced with the corresponding virtual volume ID 3005 for the user retrieved from the view table 2007 in a step 5011. Otherwise, if the data packet does not include a storage access command and volume ID, then the processing returns an "OK" condition to an invoking process, having translated the destination address for the user into a virtual destination address and the volume ID into a virtual volume ID in the data packet. In a specific embodiment in which gateway 1014 does not handle volume ID, steps 5004, 5005, 5006, 5009, 5010, 5011, and 5013 may be omitted.

Figure 6:
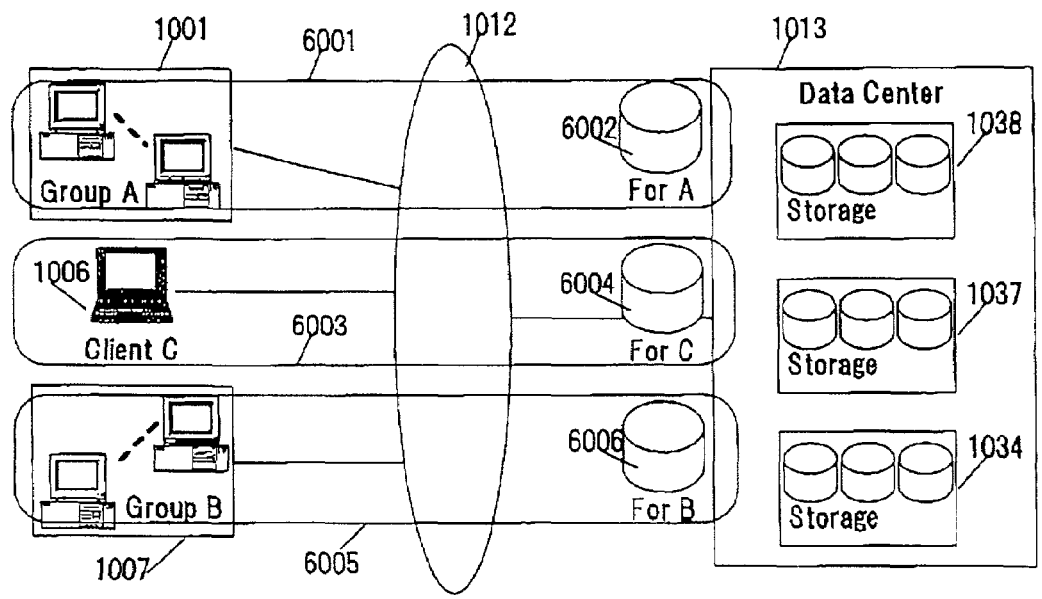
FIG. 6 illustrates a diagram of a representative storage system as seen by a user in a specific embodiment of the present invention.

FIG. 6 illustrates a diagram of a representative storage system as seen by a user in a specific embodiment of the present invention. As shown by FIG. 6, the data center 1013 comprises a plurality of volumes for storing information. In a specific embodiment, these volumes can be allocated among a plurality of storage units, such as storage units 1034, 1037 and 1038, for example. A plurality of users access information on various volumes within data center 1013, by connecting to the data center 1013 by one or more networks 1012. For example, a user, group A 1001, connects via virtual destination address 6001 via the wide area network 1012 to data center 1013. Group A 1001 is presented with an image of their storage as a virtual volume 6002. Another user, group B 1007, connects via a virtual destination address 6005 via wide area network 1012 to the data center 1013. Similarly, group B 1007 is presented with an image of their storage as a virtual volume 6006. Individual user, client C 1006, connects via virtual destination address 6003 via the wide area network 1012 to data center 1013. User C 1006 is presented with an image of their storage as a virtual volume 6004. Accordingly, the data center 1013 appears like an individual volume to each user. Further, each user is blocked from seeing storage volumes of another user inside of data center 1013.

Figure 7:
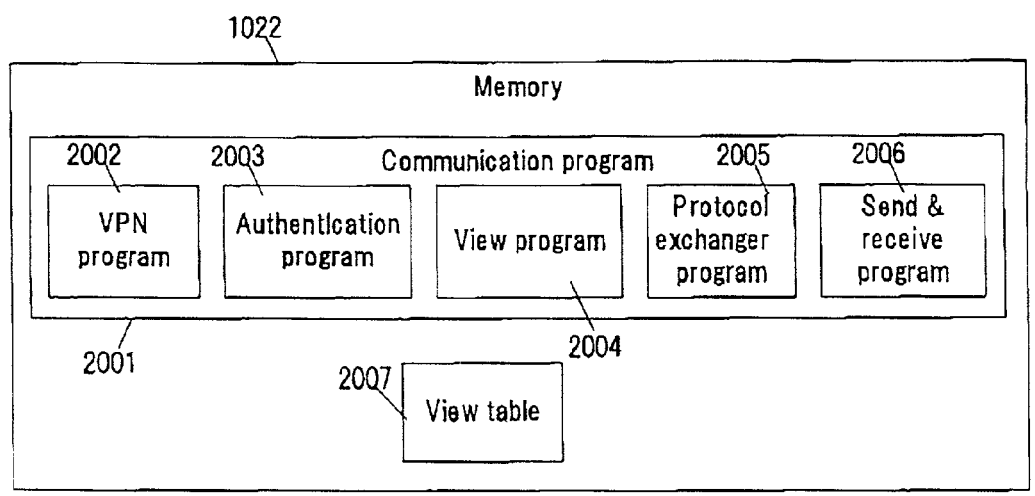
FIG. 7 illustrates a block diagram of representative programs in a specific embodiment of the present invention.

FIG. 7 illustrates a block diagram of representative programs in a specific embodiment of the present invention. In an alternative embodiment, the programs illustrated by FIG. 7 are disposed in the memory 1022 of server 1024 in FIG. 1. As shown by FIG. 7, in a specific embodiment, a communication program 2001 comprises a plurality of component program processes, including one or more of a virtual private network (VPN) program 2002, an authentication program 2003, a view program 2004, a protocol exchanger program 2005 and a send and receive program 2006. A virtual private network (VPN) program 2002 enables the user to define a private network for accessing volumes within the data center 1013 using a public network. In a specific embodiment in which a user does not use the virtual private network (VPN) for defining a private network using a public network, the VPN program 2002 may be omitted. An authentication program 2003 provides the capability to authenticate the identity of a user who attempts to access information in one of the storage devices 1034 of the data center 1013. In a specific embodiment in which the server 1024 does not check user identity, the authentication program 2003 may be omitted. A view program 2004 provides translation of virtual and real addresses of volumes for storing data in the data center 1013. A protocol exchanger program 2005 provides protocol exchange functions that enable apparatus which use different storage access protocols, such as for example, SCSI and FC, to communicate with each other. In a specific embodiment in which the user's apparatus and the storage apparatus of the data center 1013 use same kind of storage access protocol, the protocol exchanger program 2005 may be omitted. In a specific embodiment in which network 1012 and network 1025 use different network protocols, for example, network 1012 uses an IP network protocol and network 1025 uses Fibre channel, the gateway 1014 performs protocol exchange functions between these different types of network protocols. In a specific embodiment, data is received from sources external to the data center 1013 via the gateway 1014, and sent to these external targets via the gateway 1014. A send and receive program 2006 provides communications functions along the network. A view table 2007, which maintains information about storage in the data center 1013 that is allocated to various users for view program 2004, is also disposed in memory 1022 of server 1024. A specific embodiment, as illustrated by FIG. 7, enables users to have the representative user image of the data center storage as illustrated by FIG. 6.

Figure 8:
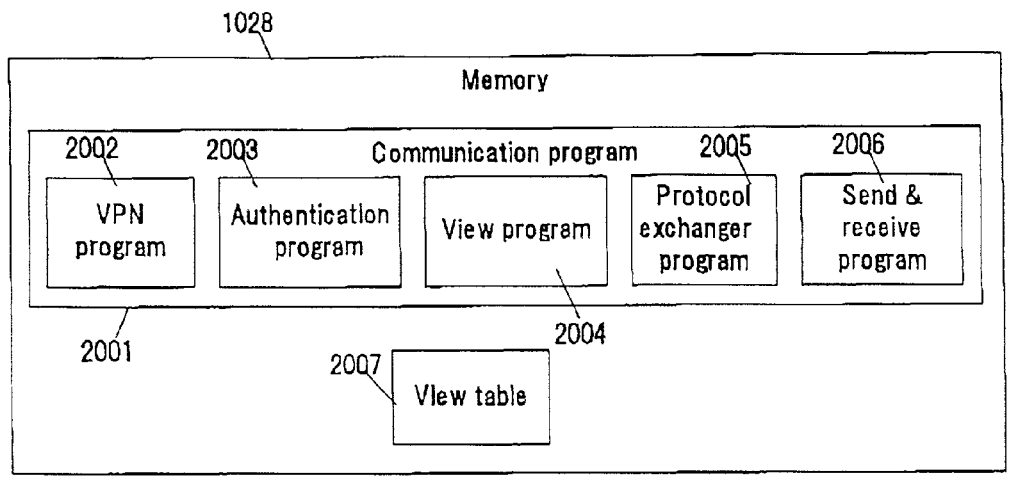
FIG. 8 illustrates a block diagram of representative programs in a specific embodiment of the present invention.

FIG. 8 illustrates a block diagram of representative programs in a specific embodiment of the present invention. In an alternative embodiment, the programs illustrated by FIG. 8 are disposed in the memory 1028 of switch 1026 in FIG. 1. As shown by FIG. 8, in a specific embodiment, a communication program 2001 comprises a plurality of component program processes, including one or more of a virtual private network (VPN) program 2002, an authentication program 2003, a view program 2004, a protocol exchanger program 2005 and a send and receive program 2006. A virtual private network (VPN) program 2002 enables the user to define a private network for accessing volumes within the data center 1013 using a public network. In a specific embodiment in which a user does not use the virtual private network (VPN) for defining a private network using a public network, the VPN program 2002 may be omitted. An authentication program 2003 provides the capability to authenticate the identity of a user who attempts to access information in one of the storage devices 1034 of the data center 1013. In a specific embodiment in which the switch 1026 does not check user identity, the authentication program 2003 may be omitted. A view program 2004 provides translation of virtual and real addresses of volumes for storing data in the data center 1013. A protocol exchanger program 2005 provides protocol exchange functions that enable apparatus connected by networks of different topologies communicate with each other, such as for example an IP network communicating with an FC network. Further, the protocol exchanger program 2005 enables apparatus which use different storage access protocols, such as for example, SCSI and FC, to communicate with each other. In a specific embodiment, in which network 1012, external to data center 1013, and network 1025, internal to data center 1013, are of the same kind, the protocol exchanger program 2005 may be omitted. In a specific embodiment, data is received from sources external to the data center 1013 via the gateway 1014, and sent to these external targets via the gateway 1014. In a specific embodiment in which network 1012 and network 1025 use different network protocols, gateway 1014 performs protocol exchange function. In this specific embodiment, switch 1026 sends packets to a port which is defined by the destination address. A send and receive program 2006 provides communications functions along the network. A view table 2007, which maintains information about storage in the data center 1013 that is allocated to various users for view program 2004, is also disposed in memory 1028 of switch 1026. A specific embodiment, as illustrated by FIG. 8, enables users to have the representative user image of the data center storage as illustrated by FIG. 6.

Figure 9:
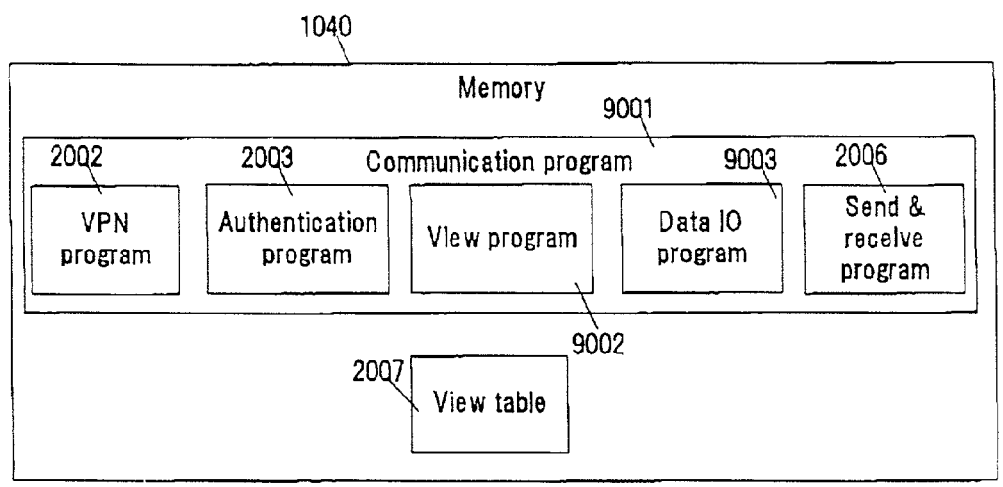
FIG. 9 illustrates a block diagram of representative programs in a specific embodiment of the present invention.

FIG. 9 illustrates a block diagram of representative programs in a specific embodiment of the present invention. In an alternative embodiment, the programs illustrated by FIG. 9 are disposed in the memory 1040 of storage device 1038 in FIG. 1. As shown by FIG. 9, in a specific embodiment, a communication program 9001 comprises a plurality of component program processes, including one or more of a virtual private network (VPN) program 2002, an authentication program 2003, a view program 9002, a data IO program 9003 and a send and receive program 2006. A virtual private network (VPN) program 2002 enables the user to define a private network for accessing volumes within the data center 1013 using a public network. In a specific embodiment in which a user does not use the virtual private network (VPN) for defining a private network using a public network, the VPN program 2002 may be omitted. An authentication program 2003 provides the capability to authenticate the identity of a user who attempts to access information in one of the storage devices 1038 of the data center 1013. In a specific embodiment in which the storage device 1038 does not check user identity, the authentication program 2003 may be omitted. A view program 9002 provides translation of virtual and real addresses of volumes for storing data in the data center 1013. A data IO program 9003 provides reading and writing of information to and from storage device 1038. A send and receive program 2006 provides communications functions along the network. A view table 2007, which maintains information about storage in the data center 1013 that is allocated to various users for view program 2004, is also disposed in memory 1040 of storage 1038. A specific embodiment, as illustrated by FIG. 9, enables users to have the representative user image of the data center storage as illustrated by FIG. 6.

Figure 10:
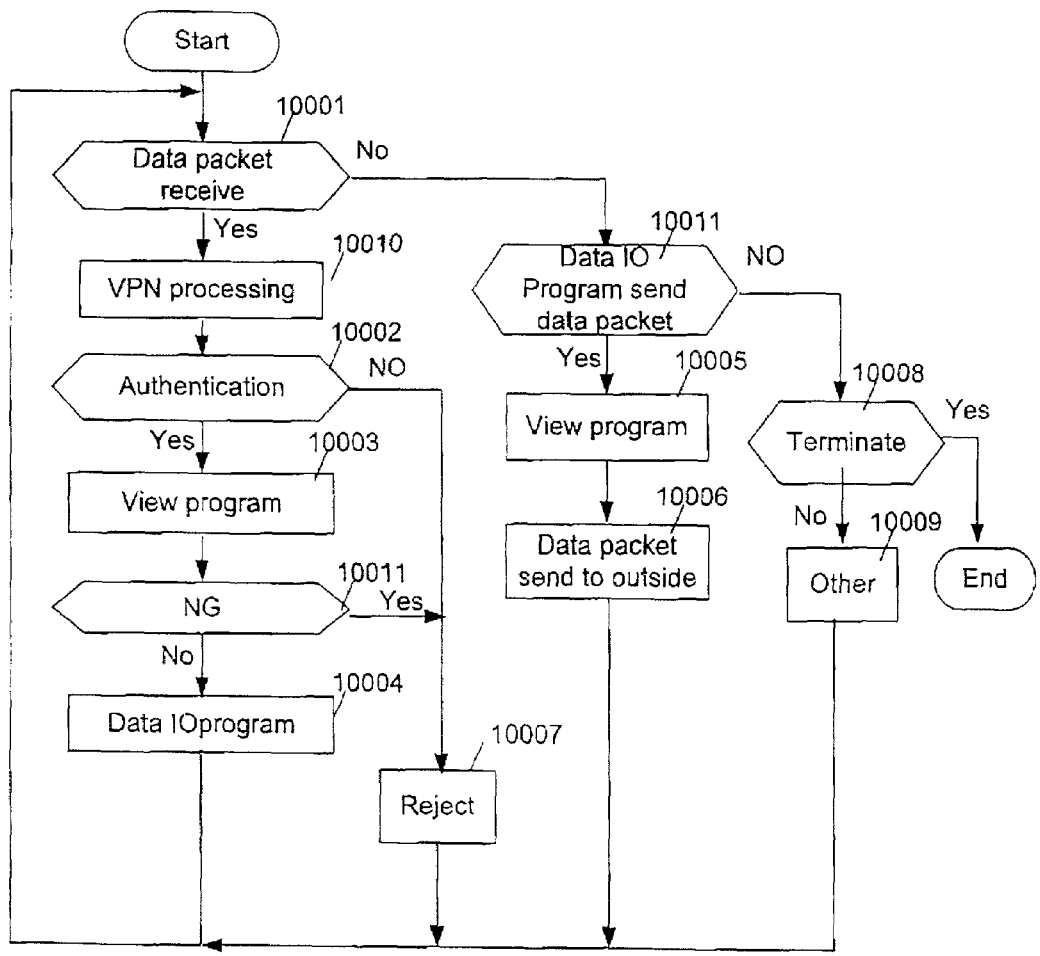
FIG. 10 illustrates a flow chart of a representative communication program in a specific embodiment of the present invention.
Figure 11:
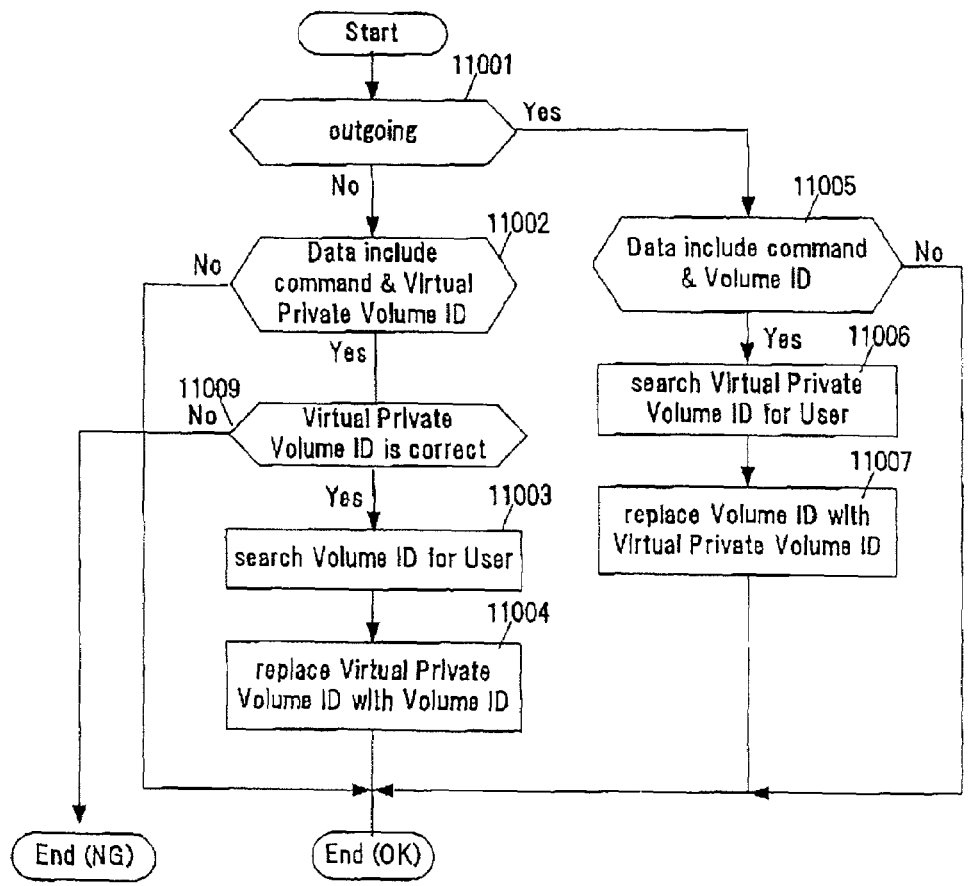
FIG. 11 illustrates a flow chart of a representative view program processing in a specific embodiment of the present invention.

FIG. 10 illustrates a flow chart of a representative communication program in a specific embodiment of the present invention. As shown in FIG. 10, in a specific embodiment, communication program 9001 resides in memory 1040 of storage device 1038. The communication program 9001 receives and processes data packets containing data to be stored on one of the volumes of the data center 1013. After a data packet is received, a check is made whether the data packet is an inbound data packet that was received from a source external to data center 10001, such as from client 1002 of Group A, for example. If the packet was received from outside of the data center 1013, then processing continues with step 10002. Otherwise, processing continues with step 10008. In an optional step 10010, the packet is processed by the virtual private network program 2002, in specific embodiments that use virtual private network to connect with data center 1013. In specific embodiments, using a virtual private network involves encrypting data before sending it through the public network and decrypting it at the receiving end. An additional level of security involves encrypting not only the data but also the originating and receiving network addresses. Accordingly, in specific embodiments, the virtual private network program 2002 performs decryption of data, and optionally address information, in the data packet. Next, the packet may be authenticated by an authentication program 2003 in an optional step 10002. If the packet passes authentication, then processing continues with a step 10003. Otherwise, the packet is rejected in a step 10007. In a step 1003, view program 9002 translates address and volume information in the data packet according to an entry for the user originating the data packet in the view table 2007. For inbound packets, the virtual volume ID is replaced with a volume ID. A representative view program process is illustrated by FIG. 11 for a specific embodiment. In a step 10011, a result of view program 9002 processing is checked. If the view program 9002 returned "no good (NG)," then the packet is rejected in step 10007, and processing continues with step 10001 for the next data packet. Otherwise, if the view program 9002 did not return "no good," then in a step 10004, data IO processing is performed. Data IO program 9003 reads information from a data packet to a volume or writes information from a data packet to a volume according to a storage access command. After data IO processing, processing continues with step 10001 for the next data packet.

If in step 10001, it is determined that the data packet was not received from outside of the data center 1013, then in a decisional step 10011, a determination is made whether the data packet is from the data IO program 9003 sending a command or data. If the data packet was sent by the data IO program 9003, then, in a step 10005, a view program 9002 translates address and volume information in the data packet according to an entry for the user originating the data packet in the view table 2007. For outbound packets, the volume ID is replaced with a virtual volume ID. Then, in a step 10006, the data packet is sent outside of the data center, and processing continues with step 10001 for the next data packet. Otherwise, if the data packet was not sent by the data IO program 9003, then in a step 10008, a check is made to determine whether to terminate processing. If the decision is made to terminate processing, then the processing is terminated. Otherwise, an error recovery process is performed in a step 10009, and then processing continues with another data packet in step 10001. In a specific embodiment in which the storage 1038 does not check user identity, authentication step 10002 may be omitted.

FIG. 11 illustrates a flow chart of a representative view program processing in a specific embodiment of the present invention. In specific embodiments, view program processing illustrated by the flow chart of FIG. 11 corresponds to view program 9002 of FIG. 9, and processing of steps 10003 and 10005 of FIG. 10. In a specific embodiment, after a data packet is received, a check is made whether the data packet is an outbound data packet that being sent from the data center 1013 in a step 11001. If the data packet is from a source external to the data center 1013, then processing continues with a step 11002. Otherwise, processing continues with a step 11005. Then, in a step 11002, a determination is made whether the data packet includes a storage access command, and if so, whether that command includes a virtual volume ID 3005. If the data packet does not include a virtual volume ID, then processing returns to an invoking process with an OK state. Otherwise, in a step 11009, a determination is made whether the virtual private volume ID for the user who sent the packet is correct, again by checking the contents of the view table 2007. If an incorrect virtual private volume ID is discovered, then processing returns a "no good" return condition to an invoking process. Otherwise, in a step 11003, the view table 2007 is searched for the volume ID 3006 corresponding to the virtual private volume ID 3005 for the user who sent the packet. Then, in a step 11004, the virtual volume ID 3005 in the data packet is replaced with a volume ID 3006 retrieved from the view table 2007.

If the data packet was not received from outside of the data center 1013, then it is an outbound packet. Accordingly, in a decisional step 11005, a determination is made whether the data packet includes a storage access command and a volume ID 3006. If the data packet includes a storage access command, and that command includes a volume ID 3006, then the view table 2007 is searched for the volume ID 3006 for the user in a step 11006. The volume ID 3006 is replaced with the corresponding virtual volume ID 3005 for the user retrieved from the view table 2007 in a step 11007. Otherwise, if the data packet does not include a storage access command and volume ID, then the processing returns an "OK" condition to an invoking process, having translated the destination address for the user into a virtual destination address and the volume ID into a virtual volume ID in the data packet. A specific embodiment, as illustrated by FIG. 11, enables users to have the representative user image of the data center storage as illustrated by FIG. 6.

In according to other embodiment of the invention, these equipment in data center, like a gateway, server, switch, and storage, any equipment has these view change function at same time.

The preceding has been a description of the preferred embodiment of the invention. It will be appreciated that deviations and modifications can be made without departing from the scope of the invention, which is defined by the appended claims.

What is claimed is:

1. A storage apparatus comprising:
   a gateway, having a processor, a memory, a virtual private network program, a view table, and at least one port operative to connect to a virtual private network, said view table including authorized user addresses, virtual destination addresses corresponding to said user addresses, destination addresses corresponding to said virtual destination addresses, virtual volume IDs corresponding to said user addresses, and volume IDs corresponding to said virtual volume IDs;
   a plurality of devices that store information, each of said devices further comprising at least one volume;
   a server;
   a switch; and
   an internal network connecting said gateway, said server, said switch, and at least one of said plurality of devices that store information; wherein
   said gateway receives a data packet for storing, retrieves a virtual destination address and a user address from said data packet, confirms that the user address retrieved corresponds to an authorized user address in the view table, uses the view table to confirm that the virtual destination address corresponds to the user address, reads from said view table a corresponding destination address for a particular one of said plurality of devices that store information, and thereupon replaces in said data packet said virtual destination address with said corresponding destination address from said view table; and wherein
   said gateway searches in said data packet for a virtual private volume identifier, and if found, thereupon confirms that said virtual private volume identifier corresponds to the user address, reads from said view table a volume identifier corresponding to said virtual private volume identifier, and replaces said virtual private volume identifier in said data packet with said volume identifier.

2. The apparatus of claim 1, wherein said gateway authenticates a source of said data packet based upon a user address in said data packet.

3. The apparatus of claim 1, wherein said virtual private network uses a first protocol and said internal network uses a second protocol, and wherein said gateway translates said data packet from said first protocol to said second protocol.

4. The apparatus of claim 3, wherein said first protocol comprises at least one of IP protocol, ATM, and Fibre channel.

5. The apparatus of claim 3, wherein said second protocol comprises at least one of IF protocol, ATM, and Fibre channel.

6. The apparatus of claim 1, wherein said gateway receives a data packet being sent to said virtual private network, and thereupon searches in said view table for a destination address retrieved from said data packet, and thereupon reads from said view table a corresponding virtual destination address, and thereupon replaces in said data packet said destination address with said corresponding virtual destination address from said view table.

7. The apparatus of claim 1, wherein said virtual destination address and said destination address are stored in a table.

8. A storage apparatus comprising:
   a server, having a processor, a memory, a virtual private network program, a view table, and at least one port operative to connect to a virtual private network, said view table including authorized user addresses, virtual destination addresses corresponding to said user addresses, destination addresses corresponding to said virtual destination addresses, virtual volume IDs corresponding to said user addresses, and volume IDs corresponding to said virtual volume IDs;
   a plurality of devices that store information, each of said devices further comprising at least one volume;
   a switch; and
   an internal network connecting said server, said switch, and at least one of said plurality of devices that store information; wherein
   said server receives a data packet for storing, retrieves a virtual destination address and a user address from said data packet, confirms that the user address retrieved corresponds to an authorized user address in the view table, uses the view table to confirm that the virtual destination address corresponds to the user address, reads from said view table a corresponding destination address for a particular one of said plurality of devices that store information, and thereupon replaces in said data packet said virtual destination address with said corresponding destination address from said view table; and wherein
   said server searches in said data packet for a virtual private volume identifier, and if found, thereupon confirms that said virtual private volume identifier corresponds to the user address, reads from said view table a volume identifier corresponding to said virtual private volume identifier, and replaces said virtual private volume identifier in said data packet with said volume identifier.

9. The apparatus of claim 8, further comprising a gateway, said gateway having a processor, a memory, and at least one port operative to connect to virtual private network, and wherein said virtual private network uses a first protocol and said internal network uses a second protocol, and wherein said gateway translates said data packet from said first protocol to said second protocol.

10. The apparatus of claim 9, wherein said first protocol comprises at least one of IP protocol, ATM, and Fibre channel.

11. The apparatus of claim 9, wherein said second protocol comprises at least one of IP protocol, ATM, and Fibre channel.

12. The apparatus of claim 8, wherein said server receives a data packet being sent to said virtual private network, and thereupon searches in said view table for a destination address retrieved from said data packet, and thereupon reads from said view table a corresponding virtual destination address, and thereupon replaces in said data packet said destination address with said corresponding virtual destination address from said view table.

13. The apparatus of claim 8, wherein said server authenticates a source of said data packet based upon a user address in said data packet.

14. A storage apparatus comprising:
a switch, having a processor, a memory, a virtual private network program, a view table, and at least one port operative to connect to virtual private network, said view table including authorized user addresses, virtual destination addresses corresponding to said user addresses, destination addresses corresponding to said virtual destination addresses, virtual volume IDs corresponding to said user addresses, and volume IDs corresponding to said virtual volume IDs;
a plurality of devices that store information, each of said devices further comprising at least one volume;
a server; and
an internal network connecting said server, said switch, and at least one of said plurality of devices that store information; wherein
said switch receives a data packet for storing, retrieves a virtual destination address and a user address from said data packet, confirms that the user address retrieved corresponds to an authorized user address in the view table, uses the view table to confirm that the virtual destination address corresponds to the user address, reads from said view table a corresponding destination address for a particular one of said plurality of devices that store information, and thereupon replaces in said data packet said virtual destination address wit said corresponding destination address from said view table; and wherein
said switch searches in said data packet for a command and a virtual private volume identifier, and if found, thereupon confirms that said virtual private volume identifier corresponds to the user address, reads from said view table for a volume identifier corresponding to said virtual private volume identifier, and replaces said virtual private volume identifier in said data packet with said volume identifier.

15. The apparatus of claim 14, further comprising a gateway, said gateway having a processor, a memory, and at least one port operative to connect to a virtual private network, and wherein said virtual private network uses a first protocol and said internal network uses a second protocol, and wherein said gateway translates said data packet from said first protocol to said second protocol.

16. The apparatus of claim 15, wherein said first protocol comprises at least one of IP protocol, ATM, and Fibre channel.

17. The apparatus of claim 15, wherein said second protocol comprises at least one of IP protocol, ATM, and Fibre channel.

18. The apparatus of claim 14, wherein said switch receives a data packet being sent to said virtual private network, and thereupon searches in said view table for a destination address retrieved from said data packet, and thereupon reads from said view table a corresponding virtual destination address, and thereupon replaces in said data packet said destination address with said corresponding virtual destination address from said view table.

19. The apparatus of claim 14, wherein said switch authenticates a source of said data packet based upon a user address in said data packet.

20. A storage apparatus comprising:
a plurality of devices that store information, each of said devices further comprising at least one volume, a processor, a memory, a virtual private network program, a view table, and at least one port operative to connect to a virtual private network, said view table including authorized user addresses, virtual destination addresses corresponding to said user addresses, destination addresses corresponding to said virtual destination addresses, virtual volume IDs corresponding to said user addresses, and volume IDs corresponding to said virtual volume IDs;
a switch;
a server; and
an internal network connecting said server, said switch, and at least one of said plurality of devices that store information; wherein
at least one of said plurality of devices that store information receives a data packet for storing, retrieves a virtual destination address and a user address from said packet, confirms that the user address retrieved corresponds to an authorized user address in the view table, uses the view table to confirm that the virtual destination address corresponds to the user address, reads from said view table a corresponding destination address for a particular one of said plurality of devices that store information, and thereupon replaces in said data packet said virtual destination address with said corresponding destination address from said view cable; and wherein
said particular one of said plurality of devices that store information searches in said data packet for virtual private volume identifier, and if found, thereupon confirms that said virtual private volume identifier corresponds to the user address, reads from said view table for a volume identifier corresponding to said virtual private volume identifier, and replaces said virtual private volume identifier in said data packet with said volume identifier.

21. The apparatus of claim 20, further comprising a gateway, said gateway having a processor, a memory, and at least one pod operative to connect to a virtual private network, and wherein said virtual private network uses a first protocol and said internal network uses a second protocol, and wherein said gateway translates said data packet from said first protocol to said second protocol.

22. The apparatus of claim 21, wherein said first protocol comprises at least one of IP protocol, ATM, and Fibre channel.

23. The apparatus of claim 21, wherein said second protocol comprises at least one of IP protocol, ATM, and Fibre channel.

24. The apparatus of claim 20, wherein at least one of said plurality of devices that store information receives a data packet being sent to said virtual private network, and thereupon searches in said view table for a destination address retrieved from said data packet and thereupon reads from said view table a corresponding virtual destination address, and thereupon replaces in said data packet said destination address with said corresponding virtual destination address from said view table.

25. The apparatus of claim 20, wherein said at least one of said plurality of devices that store information authenticates a source of said data packet based upon a user address in said data packet.

26. A method for managing storage, comprising:

receiving a data packet;

retrieving a virtual destination address and a user address from said data packet;

using a view table to confirm that the user address retrieved corresponds to an authorized user address in the view table, the view table including authorized user addresses, virtual destination addresses corresponding to said user addresses, destination addresses corresponding to said virtual destination addresses, virtual volume IDs corresponding to said user addresses, and volume IDs corresponding to said virtual volume IDs;

using the view table to confirm that the virtual destination address retrieved from said data packet corresponds to the user address;

reading from the view table a corresponding destination address for a particular one of a plurality of devices that store information;

replacing in said data packet said virtual destination address with said corresponding destination address from the view table;

retrieving a virtual private volume identifier from said data packet;

confirming that the virtual private volume identifier retrieved from said data packet corresponds to the user address;

reading from said view table a corresponding private volume identifier of a volume in one of said plurality of devices that store information; and replacing in said data packet said virtual private volume identifier with said corresponding private volume identifier.

* * * * *